United States Patent [19]

Giacomello

[11] 4,403,393
[45] Sep. 13, 1983

[54] ACCELERATED AGING-IMPREGNATION OF ELECTROLYTIC CAPACITORS

[75] Inventor: Giacomo Giacomello, Milan, Italy

[73] Assignee: Sprague Electric Company, North Adams, Mass.

[21] Appl. No.: 314,281

[22] Filed: Oct. 23, 1981

[51] Int. Cl.³ .............................................. H01G 9/24
[52] U.S. Cl. ...................................................... 29/570
[58] Field of Search .................................. 29/570, 575

[56] References Cited

U.S. PATENT DOCUMENTS 2,234,608  3/1941  Robinson et al. ...................... 29/570
2,351,321  6/1944  Compton ............................... 29/570
2,393,966  2/1946  Brennan ................................. 29/570
3,137,058  6/1964  Giacomello ........................... 29/570

Primary Examiner—L. Dewayne Rutledge
Assistant Examiner—Alan E. Schiavelli

[57] ABSTRACT

A process for the accelerated aging and impregnation of electrolytic capacitors having formed anodes is carried out in two stages. In the first stage, the capacitors are loaded into a centrifuge, a voltage less than final aging voltage is applied, the pressure within the centrifuge is reduced, the centrifuge is started, and then electrolyte is admitted to impregnate the capacitors. When the capacitors are fully impregnated, the aging voltage is increased to the desired final value.

5 Claims, 1 Drawing Figure

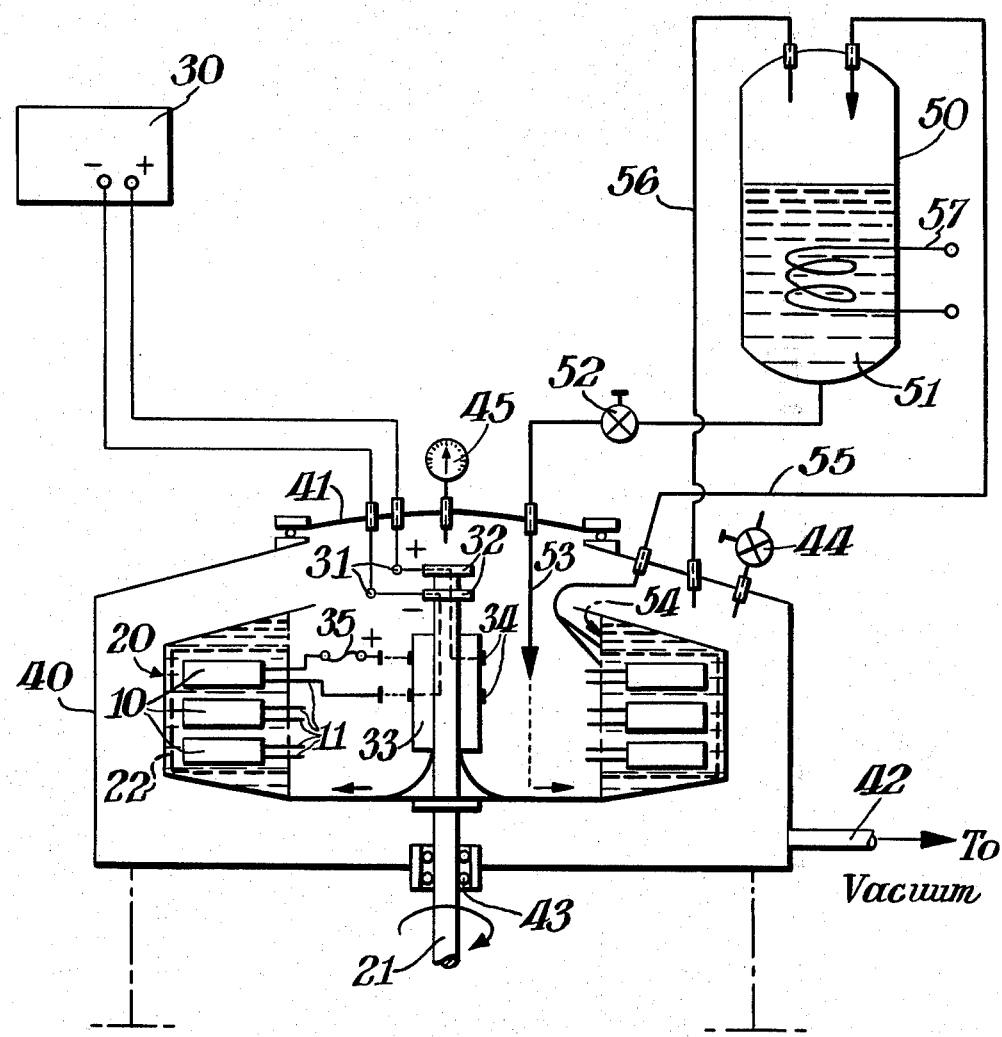

ACCELERATED AGING-IMPREGNATION OF ELECTROLYTIC CAPACITORS

BACKGROUND OF THE INVENTION

This invention relates to the accelerated aging and impregnation of electrolytic capacitors having formed anodes while centrifuging under reduced pressure first at less than desired voltage until impregnation is complete and then at final desired voltage.

Capacitors are aged by applying voltage to repair any damage to anodized electrode foils occurring during the assembly of the capacitor or to repair weak places or imperfections in the anodized layer. It is recognized that the same minimum leakage current can be obtained immediately after the aging process with both perfectly and imperfectly aged capacitors, and it is believed that entrapped bubbles of hydrogen, produced during the aging process are responsible for this anomaly.

Various methods have been devised to reduce this anomaly including aging for longer times and/or at higher temperatures, and aging while impregnating the capacitor. It has also been taught to apply vibration while impregnating and aging the capacitor and/or reduce the pressure. It has been suggested that a centrifugal impregnation process while forming the capacitor be applied to the aging process.

SUMMARY OF THE INVENTION

It is an object of this invention to accelerate the impregnation and aging of aluminum electrolytic capacitors with formed anodes in a centrifuge under reduced pressure by applying an aging voltage which is less than the desired value to obtain a partial aging and subsequently increasing the voltage to the final desired value for final, complete aging.

Gas formed by the impregnation of the capacitors while under the influence of voltage flows easily out of the capacitors because of the pressure difference between the inside and the outside of the capacitors caused by the centrifuging and the reduced pressure. During the progressive impregnation of the capacitors, a high intensity current is applied to the capacitors to partially age them. When the capacitors are fully impregnated, then the aging voltage is increased to the final aging voltage, and shortly before aging is complete, the pressure inside the centrifuge is increased to atmospheric pressure.

While low voltage capacitors can be aged by applying 100% of the aging voltage immediately, higher voltage ones can not be so aged or scintillation may occur. In order to avoid scintillation, a voltage which is less than the final desired voltage, i.e. 75-85% and preferably 80% of the final voltage, is applied until the capacitors are fully impregnated. While a lower level such as 50% of the desired voltage could be used, use of the lower level would considerably lengthen the aging time which is undesirable.

The impregnation-aging process of the present invention reduces aging time to approximately one-half the time of the prior art processes. The process is also particularly useful for large-size capacitors. The preferred reduced pressure is 50 torr or less but not so low that the electrolyte used to impregnate the capacitors boils. The reduced pressure level was determined experimentally to give the desired accelerated aging and impregnation with most electrolytes.

BRIEF DESCRIPTION OF THE DRAWING

FIG. 1 shows a view arrangement for carrying out the process of this invention.

DESCRIPTION OF THE PREFERRED EMBODIMENTS

According to the present invention, electrolytic capacitors are aged at less than final aging voltage while being impregnated under reduced pressure in a centrifuge. Once the capacitors are fully impregnated, aging voltage is increased to 100% aging voltage. Near the end of the aging, when the current decreases rapidly and levels off, atmospheric pressure is re-established in the centrifuge.

One way of carrying out the process is shown in FIG. 1. Electrolytic capacitors 10 are loaded into centrifuge 20 located in a vacuum pressure vessel 40. The capacitors 10 are placed in perforated racks 22. The centrifuge 20 is mounted on a rotating shaft 21 that also carries an insulated support 33 bearing buss bars 34. Shaft 21 passes through a rotating vacuum seal ring 43 to a driving means (not shown). The vacuum tank 40 is closed by a hermetically sealed cover 41 bearing pressure gauge 45.

The terminals 11 of capacitors 10 are connected to the respective positive and negative bus bars 34 through fuse 35. Cover 41 is closed and sealed, and then direct current voltage from power supply 30 is applied to the capacitor 10 through contacts 31 and rings 32. Centrifuge 20 is started, and when the desired speed is reached, pressure in pressure vessel 40 and centrifuge 20 is reduced via vacuum line 42. When the pressure is reduced, preferably to 50 torr or less, valve 52 is opened admitting electrolyte 51. Electrolyte 51 flows to the bottom and up the sides of centrifuge 20 establishing an electrolyte level that parallels final electrolyte level 54 and is forced through capacitors 10 from bottom to top. Since capacitors 10 are under the influence of an aging voltage, preferably about 80% of final aging voltage, gas is formed. The impregnating electrolyte 51 forces the gas out of capacitors 10.

Overflow line 55 controls the electrolyte maximum level 54, and pressure equalization line 56 equalizes the pressure between tank 40 and closed electrolyte reservoir 50. A heat exchanger 57 keeps the temperature of electrolyte 51 at the desired level which must be below the boiling point of the electrolyte at the reduced pressure used.

When capacitors 10 are fully impregnated, aging voltage is increased to 100% of the desired value to complete the aging reaction. The gas generated in this stage, with the capacitors 10 still immersed in electrolyte 51, expels part of the electrolyte during its escape and causes more electrolyte to be drawn into the bottom of the capacitor and circulate through it because of the pressure differential between the bottom and top of the capacitors.

By placing the capacitors under the influence of voltage, centrifuge, and reduced pressure before starting the impregnation, when the electrolyte is introduced, a pressure disequilibrium is set up between the gas produced during aging and the chamber favoring its escape under reduced pressure by the increased mobility of the gas. The aging reaction rate becomes a function of the amount of current supplied until damaged areas on the anodized foil have been repaired. The maximum aging current density is dependent upon the electrolyte recycle rate to avoid excessive heating effects in the capacitor. Partial aging at below the rated value of the capacitor provides a balance between aging rate and heating effects with 75-85% of the final aging voltage being preferred.

After a rapid drop in current, showing that aging is almost complete, atmospheric pressure is reestablished in centrifuge 40 by discontinuing suction and opening valve 44. Centrifuging is continued at atmospheric pressure until aging is essentially complete. If it is desired, the aging can be continued until the capacitors aged with low current density and at constant internal temperature to further improve leakage currents.

What is claimed is:

1. A two-stage process for accelerated aging and impregnating electrolytic capacitors comprising a first stage sequence of first loading capacitors having formed anodes into a centrifuge, second supplying a voltage less than the desired final aging voltage to said capacitors, third reducing pressure within said centrifuge, fourth starting said centrifuge, fifth admitting impregnating electrolyte, and aging said capacitors while centrifuging and impregnating until said capacitors are fully impregnated, and a second stage of increasing said voltage to said desired aging voltage.

2. A process according to claim 1 wherein when said aging is almost complete, atmospheric pressure is reestablished within said centrifuge, and said aging is completed at atmospheric pressure.

3. A process according to claim 2 wherein said centrifuging and application of said aging voltage is continued for an additional period with said capacitors at constant internal temperature.

4. A process according to claim 1 wherein said pressure is reduced to 50 torr or less before said impregnating electrolyte is admitted.

5. A process according to claim 1 wherein said voltage initially applied is 80% of said final aging voltage.

* * * * *